(12) United States Patent
Sealey et al.

(10) Patent No.: US 8,361,312 B2
(45) Date of Patent: Jan. 29, 2013

(54) METHODS FOR REMOVAL OF COLORED- AND SULFUR-CONTAINING IMPURITIES FROM HYDROCARBON STREAMS

(75) Inventors: Amy Sealey, Bozeman, MT (US); Randi Wytcherley, Belgrade, MT (US)

(73) Assignee: GTC Technology, LP, Houston, TX (US)

( * ) Notice: Subject to any disclaimer, the term of this patent is extended or adjusted under 35 U.S.C. 154(b) by 255 days.

(21) Appl. No.: 12/706,923

(22) Filed: Feb. 17, 2010

(65) Prior Publication Data

US 2011/0011770 A1  Jan. 20, 2011

Related U.S. Application Data

(60) Provisional application No. 61/226,633, filed on Jul. 17, 2009.

(51) Int. Cl.
*C07C 7/12* (2006.01)

(52) U.S. Cl. .................... 208/213; 208/208 R; 585/820; 585/823

(58) Field of Classification Search .................. None
See application file for complete search history.

(56) References Cited

U.S. PATENT DOCUMENTS

| 3,897,226 A | 7/1975 | Doherty |
| 4,856,320 A | 8/1989 | Bose et al. |
| 5,081,325 A | 1/1992 | Haynal et al. |
| 5,207,894 A | 5/1993 | Presnall et al. |
| 5,849,982 A | 12/1998 | Lee et al. |
| 5,877,385 A | 3/1999 | Lee et al. |
| 2006/0173225 A1 | 8/2006 | Das et al. |

FOREIGN PATENT DOCUMENTS

WO   WO-92/06938 A1   4/1992

OTHER PUBLICATIONS

Young, Lee W., "International Search Report" for PCT/US10/35890 as mailed Jul. 12, 2010 (2 pages).

*Primary Examiner* — Tam M Nguyen
(74) *Attorney, Agent, or Firm* — Winstead PC

(57) ABSTRACT

In various embodiments, the present disclosure describes methods for removing impurities from a hydrocarbon stream containing at least one vinyl aromatic compound such as, for example, styrene. The methods include pretreating at least one sorbent to make the at least one sorbent operable for adsorbing the impurities, contacting the hydrocarbon stream with the at least one sorbent in order to adsorb at least a portion of the impurities and separating the hydrocarbon stream from the at least one sorbent. Impurities include, for example, colored impurities, sulfur-containing impurities and combinations thereof.

18 Claims, 1 Drawing Sheet

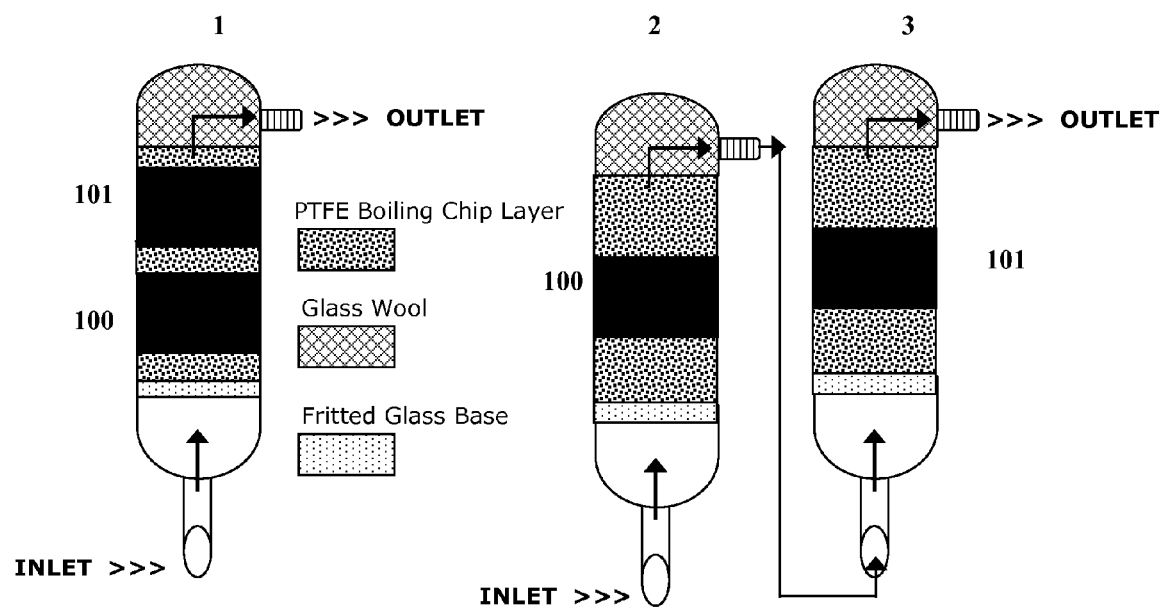
*FIG. 1A*  *FIG. 1B* ns, patents, or publications, related or not, unless specifi-
METHODS FOR REMOVAL OF COLORED- AND SULFUR-CONTAINING IMPURITIES FROM HYDROCARBON STREAMS

CROSS-REFERENCE TO RELATED APPLICATIONS

This application claims priority to U.S. provisional patent application 61/226,633, filed Jul. 17, 2009, which is incorporated by reference herein in its entirety.

STATEMENT REGARDING FEDERALLY SPONSORED RESEARCH

Not applicable.

BACKGROUND

Styrene is a commodity chemical commonly used in the manufacture of many types of consumer products including, for example, plastics (polystyrene and co-polymers thereof), rubbers, and resins. Styrene-based consumer products are routinely used in food, safety and health applications. Stability, purity and appearance of the styrene monomer may be important for the intended end use in these and other applications.

Styrene monomer purity may determine the properties of the styrene-based material ultimately produced. For example, impurities may inhibit the ability of styrene to polymerize to a desired polymer molecular weight and impact the mechanical properties of the polymer so obtained. Color of the polymer may also be impacted by impurities. The presence of impurities may additionally influence the stability of styrene monomer during storage due to the reactive nature of the styrene vinyl group. Premature styrene polymerization or oligomerization not only leads to styrene loss, but also to potential fouling of a styrene processing system.

Catalytic dehydrogenation of ethylbenzene is the most common method by which styrene is produced. Styrene produced in this manner is a colorless liquid with a very low sulfur content. Styrene is also present in hydrocarbon streams such as, for example, pyrolysis gasoline. Although separation of styrene from pyrolysis gasoline and other hydrocarbon streams has typically been considered difficult, recent advances in separations technology have enabled styrene to be obtained, albeit at significant cost. For example, styrene can be recovered from raw pyrolysis gasoline derived from the steam cracking of naphtha, gas oils and natural gas liquids (NGL). However, the quality of styrene directly obtained from a hydrocarbon stream such as pyrolysis gasoline is typically inferior to that obtained by dehydrogenation of ethylbenzene.

In view of the foregoing, efficient methods to remove impurities from a hydrocarbon stream containing styrene and other vinyl aromatic compounds would be desirable in the art. With the availability of such impurity removal methods, non-conventional hydrocarbon streams such as pyrolysis gasoline may become a more attractive feedstock for production of high value commodity chemicals such as, for example, styrene. In the case of styrene and other vinyl aromatic compounds, such purification methods would advantageously lead to enhanced monomer stability, prevent fouling of processing systems and lead to greater reproducibility during polymerization reactions.

SUMMARY OF THE INVENTION

In various embodiments, methods for removing impurities from a hydrocarbon stream containing at least one vinyl aromatic compound are described herein. The methods include contacting the hydrocarbon stream with at least one sorbent that adsorbs at least a portion of the impurities from the hydrocarbon stream to form a purified hydrocarbon stream and then separating the purified hydrocarbon stream from the at least one sorbent.

Other various embodiments of methods for removing impurities from a hydrocarbon stream include pretreating at least one sorbent to form at least one treated sorbent and contacting the hydrocarbon stream with the at least one treated sorbent to adsorb at least a portion of the impurities from the hydrocarbon stream. The pretreating step includes a) washing the at least one sorbent with a solvent, b) adjusting the pH of the at least one sorbent while in the solvent, c) degassing the at least one sorbent while in the solvent, d) removing the solvent from the at least one sorbent, and e) drying the at least one sorbent. Impurities include, for example, colored impurities, sulfur-containing impurities and combinations thereof.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 1A shows an illustrative schematic of a column bed containing two sorbents for removing impurities from a hydrocarbon stream; and FIG. 1B shows an illustrative schematic of two column beds linked in series, each column bed containing a sorbent for removing impurities from a hydrocarbon stream.

DETAILED DESCRIPTION OF ILLUSTRATIVE EMBODIMENTS

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

As used herein, the term "aromatic" refers to aromaticity, a chemical property in which a conjugated ring of unsaturated bonds, lone pairs, or empty orbitals exhibit a stabilization stronger than would be expected by the stabilization of conjugation alone. It can also be considered a manifestation of cyclic delocalization and of resonance stabilization. This is usually considered to be because electrons are free to cycle around circular arrangements of atoms, which are alternately single- and double-bonded to one another.

As used herein, the term "aliphatic" refers to compounds having carbon atoms that are capable of being joined together in straight chains, branched chains, or rings (in which case they are called alicyclic). They can be joined by single bonds (alkanes), double bonds (alkenes), or triple bonds (alkanes).

As used herein, the term "Bentonite" refers to an aluminum phyllosilicate clay consisting primarily of montmorillonite.

As used herein, the term "polymer" will collectively refer to polymers of vinyl aromatic compounds including dimers, trimers, higher oligomers and polymers.

Other than in the operating examples, or where otherwise indicated, all numbers expressing quantities of components used herein are to be understood to be modified in all instances by the term "about".

Embodiments of the present disclosure are directed to methods for removing colored- and sulfur-containing impurities from styrene or related vinyl aromatic compounds produced from pyrolysis gasoline or other hydrocarbon streams. The methods include treatment of the styrene or vinyl aromatic compounds with at least one sorbent or a sorbent mixture pretreated in such a way that the sorbent adsorbs at least a portion of the colored- and sulfur-containing impurities contained within the hydrocarbon stream. The pretreated sorbents may also be used to improve the effectiveness of or in combination with additional purification methods such as, for example, chemical treatment, distillation and combinations thereof.

In various embodiments, methods for removing impurities from a hydrocarbon stream containing at least one vinyl aromatic compound are described herein. The methods include contacting the hydrocarbon stream with at least one sorbent that adsorbs at least a portion of the impurities from the hydrocarbon stream to form a purified hydrocarbon stream and then separating the purified hydrocarbon stream from the at least one sorbent. In some embodiments, the at least one vinyl aromatic compound is styrene. In some embodiments, the impurities include, for example, colored impurities, sulfur-containing impurities and combinations thereof. In some embodiments, the hydrocarbon stream is pyrolysis gasoline.

In other various embodiments, methods for removing impurities from a hydrocarbon stream include pretreating at least one sorbent to form at least one treated sorbent and contacting the hydrocarbon stream with the at least one treated sorbent to adsorb at least a portion of the impurities from the hydrocarbon stream. The pretreating step includes a) washing the at least one sorbent with a solvent, b) adjusting the pH of the at least one sorbent while in the solvent, c) degassing the at least one sorbent while in the solvent, d) removing the solvent from the at least one sorbent, and e) drying the at least one sorbent. Impurities include, for example, colored impurities, sulfur-containing impurities and combinations thereof. In some embodiments, the at least one vinyl aromatic compound is styrene. In some embodiments, the methods further include separating the hydrocarbon stream from the at least one sorbent and isolating styrene after the contacting step.

In the description that follows, methods for removing colored impurities and sulfur-containing impurities from styrene are disclosed. However, removal of colored impurities and sulfur-containing impurities from any vinyl aromatic compound lie within the spirit and scope of the embodiments of the present disclosure.

In general, colored impurities and sulfur-containing impurities removed by the methods of the present disclosure have a boiling point close to that of styrene. Oftentimes, the impurities also have chemical structures related to that of styrene and other vinyl aromatic compounds. Typically, such impurities are co-present with styrene or other vinyl aromatic compounds in a hydrocarbon stream such as, for example, pyrolysis gasoline. Non-limiting examples of colored impurities include oxygenated compounds (such as alcohols, ketones and aldehydes) and conjugated olefins. Non-limiting examples of sulfur-containing compounds include sulfides, mercaptans and thiophenes. Such sulfur-containing compounds may also contribute color to a hydrocarbon stream.

In various embodiments, the sorbents used in the methods of the present disclosure are clays. In some embodiments the clays include, for example, Bentonite or Fuller's Earth. In other embodiments, the clay can be various proprietary clays available from GTC Technology US, LLC. Depending on the geographic source of the proprietary clays, the clay characteristics can vary widely. For example, the proprietary clays can vary in appearance from fine, sandy particulates to either sand-like clay or small jagged rock-like clay. The elemental composition of the proprietary clays may also vary significantly.

Although use of clays to remove contaminants from aromatic hydrocarbon streams is known in the art, Applicants have found that pretreatment of the sorbents (clays) to a pH of greater than about 9 in some embodiments or greater than about 10 in other embodiments is advantageous for activating the clay and making it operable for removing impurities from the hydrocarbon streams of the present disclosure. In some embodiments, the pH of the sorbent (clay) is adjusted to about 10. In contrast, prior use of clays for removing impurities from aromatic hydrocarbon streams have generally used neutral clays or clays with a pH of less than 9. Applicants have found that such clays are more likely to generate polymer via cation/anion induced polymerization mechanisms than are the treated clays described in the present disclosure. Furthermore, Applicants have found that a neutral clay may be combined with a clay pretreated according to embodiments described herein to achieve a greater purification than is possible using either clay alone.

In various embodiments, the sorbents of the present disclosure are pretreated before the hydrocarbon stream comes into contact with the sorbent. In various embodiments, the pretreating step includes a) washing the sorbent with a solvent, b) adjusting the pH of the sorbent while in the solvent, c) degassing the sorbent while in the solvent, d) removing the sorbent from the solvent and e) drying the sorbent prior. In some embodiments, removing the sorbent from the solvent takes place by filtering. The pretreatment steps described above generally take place before prewetting and contacting of the sorbent with the aromatic stream takes place. The pretreated sorbents may also be used to improve the effectiveness of or in combination with other purification methods such as, for example, chemical treatment, distillation and combinations thereof.

In various embodiments of the present disclosure, effectiveness of the removal of colored impurities from a hydrocarbon stream may be determined using ASTM D1209 Standard Test Method for Color of Clear Liquids (Platinum-Cobalt Scale).

In various embodiments, styrene may be isolated from the hydrocarbon stream after the step of contacting the sorbent. Isolation of styrene may be conducted by any method known to those of ordinary skill in the art. In other various embodiments, styrene can be isolated from pyrolysis gasoline using methods described in U.S. Pat. Nos. 5,849,982 and 5,877,385, each of which are incorporated by reference herein in their entirety. Among the teachings of these patents are producing a pyrolysis gasoline heart cut that has been deoctanized and deheptanized to contain about 25% to about 35% styrene. The styrene at this point has an ASTM D1209 color number between 300 and 500. After selective hydrogenation to remove phenylacetylene, extractive distillation is performed to separate styrene from the remaining components of the mixture such as, for example, o-xylene. The styrene is recovered in a solvent, which is then fed to a solvent recovery column to remove solvent and recover isolated styrene. Recovered solvent is then fed back to the extractive distillation column. During the styrene extractive distillation process, some of the color impurities are removed. However, without additional steps to remove colored impurities, the purified styrene typically contains residual colored impurities that impart an ASTM D1209 color number of about 30 to about 40.

The color specification for purified styrene monomer as set forth by ASTM D2827 (Standard Specification for Styrene Monomer) is an ASTM D1209 color number of 10. Therefore, additional color removal is generally considered necessary in order to meet standard color specifications.

In some embodiments, two sorbents are contacted with the hydrocarbon stream. In certain embodiments, the two sorbents are pretreated separately and then placed in a bed prior to the contacting step. In some embodiments, the two sorbents are mixed in the bed, and in other embodiments, the sorbents remain separated in distinct zones. In other various embodiments, the two sorbents are pretreated separately and are then placed in separate beds arranged in series prior to the contacting step. In such embodiments, the hydrocarbon stream flows through the first bed prior to encountering the sorbent placed in the second bed.

EXPERIMENTAL EXAMPLES

The following examples are provided to more fully illustrate some of the embodiments disclosed hereinabove. It should be appreciated by those of skill in the art that the techniques disclosed in the examples that follow represents techniques that constitute exemplary modes for practice of the disclosure. Those of ordinary skill in the art should, in light of the present disclosure, appreciate that many changes can be made in the specific embodiments that are disclosed and still obtain a like or similar result without departing from the spirit and scope of the disclosure.

Example 1

Removal of Colored Impurities and Sulfur-Containing Impurities from Simulated Pyrolysis Gasoline. An inhibited mimetic pyrolysis gasoline source containing styrene, colored-impurities and sulfur-containing impurities was prepared. Content of the mimetic pyrolysis gasoline is set forth in Table 1. As used herein, the term "mimetic pyrolysis gasoline" refers to, for example, a mixture containing a limited number of the more common components found in conventional pyrolysis gasoline.

TABLE 1

Composition of Mimetic Pyrolysis Gasoline

| Chemical | Color Causing | Sulfur Containing | Amount (ppm) |
| --- | --- | --- | --- |
| Stable free radical inhibitor | | | 15 |
| 6,6-dimethylfulvene | ✓ | | 50 |
| 2-vinyl thiophene | | ✓ | 50* |
| dimethyl thiophene | | ✓ | 50* |
| hexane-1-thiol | | ✓ | 50* |
| dipropylsulfide | | ✓ | 50* |

*ppm refers to sulfur content only, not the total ppm concentration of the compound Clay pretreatment: One part clay (200-600 ml) was washed with 3 parts water. While the clay was still in the water, the pH was balanced to 7 or 10, and the clay was then degassed. After degassing, the clay was collected by filtration and dried in an oven. The dried clay was pre-wetted by submersion in ethylbenzene for 20 minutes with occasional agitation. The ethylbenzene/clay mixture was then filtered using a light vacuum to remove excess ethylbenzene while keeping clay completely wetted. Wetted clay was thereafter immediately packed into a plug flow reactor to minimize solvent evaporation.

Plug flow reactor system preparation: The plug flow reactor system was prepared by filling a 1 L four-necked, round bottom flask with 1 L of the mimetic pyrolysis gasoline described in Table 1. FIG. 1 further shows an illustrative schematic in which the pretreated clays are packed into a column or columns. FIG. 1A shows an illustrative schematic of a column bed 1 containing sorbents 100 and 101 for removing impurities from a hydrocarbon stream. FIG. 1B shows an illustrative schematic of two column beds 2 and 3 linked in series, each column bed containing a sorbent 101 and 102 for removing impurities from a hydrocarbon stream. In a first packing method, a single column containing two separate clay beds was prepared (FIG. 1A). In a second packing method, two columns linked in series were prepared in which there was one clay bed per column (FIG. 1B).

According to the first column packing method described hereinabove, a glass column equipped with fritted glass base and detachable head piece was packed with two-70 mL clay beds (sorbents 100 and 101), as per the experimental matrix illustrated in Table 2. The detachable head piece was packed with glass wool. Polytetrafluoroethylene (PTFE) boiling chips provided a transition zone between the clay beds as shown in FIG. 1A.

According to the second column packing method, each glass column was packed with a 70 ml bed of clay (sorbents 100 and 101), PTFE boiling chips, and glass wool as shown in FIG. 1B. The two columns were connected with MASTERFLEX VITON tubing to link the two clay beds in series.

Once the column(s) was/were packed, the plug flow reactor system was constructed by connected the column(s) to the feed vessel containing the mimetic pyrolysis gasoline using a pump. A product collection area followed the column(s). Connections were made with MASTERFLEX VITON tubing. The pump was a peristaltic pump operating at a flow rate of 2.33 mL/min. This flow rate along with the column dimensions provided a liquid hourly space velocity (LHSV) of 1 $hr^{-1}$.

The mimetic pyrolysis gasoline was pumped out of the feed vessel into the base of the column, through the clay beds, and out of the top of the column into the product collection area. Samples were collected every 10 minutes by first draining the collected product via a product sampling port and allowing the collection area to refill with fresh sample to the desired time point. Each aliquot of collected product was pooled into a sealed flask. The total volume of accumulated product was obtained as well as a final pooled product sample.

TABLE 2

Plug Flow Reactor Experimental Matrix

| Experiment Number | Bottom Layer (Inlet) | Top Layer (Outlet) | Column Setup |
|---|---|---|---|
| 1 | Pretreated Clay 1 (pH = 10) | Pretreated Clay 2 (pH = 7) | Double-packed |
| 2 | Pretreated Clay 2 (pH = 7) | Pretreated Clay 1 (pH = 10) | Double-packed |
| 3 | Pretreated Clay 3 (pH = 10) | Pretreated Clay 2 (pH = 7) | Double-packed |
| 4 | Pretreated Clay 2 (pH = 7) | Pretreated Clay 3 (pH = 10) | Single-packed in series |

Clay 1 = proprietary clay #1
Clay 2 = proprietary clay #2
Clay 3 = proprietary clay #3

Table 3 summarizes color number results of the treated samples. As can be seen in Table 3, color removal where pretreated clays with a final pH of 7 were used or combined with pretreated clays with a final pH of 10 consistently resulted in the removal of >79% of the color. In most cases, color number was determined after sorbent contact, followed by a single stage flash distillation (SSFD). When a pretreated clay with a final pH of 7 was used alone, only about 30% of the color was removed. When a pretreated clay with a final pH of 10 was used alone, about 78% of the color was removed. In the cases where distillation was performed, five distillation samples from the overhead condensate were collected for color determination, and the three overhead condensate samples with the lowest color number were averaged.

Example 2

Removal of Colored Impurities and Sulfur-Containing Impurities from Heavy Pyrolysis Gasoline. A commercial sample of heavy pyrolysis gasoline with a boiling point range of 100° C. to 290° C. was obtained. The sample was deheptanized and deoctanized, producing a heart cut. Samples of the heart cut were obtained and contacted with various sorbents to determine the amount of color removed. A portion of the heart cut was further hydrotreated to reduce phenylacetylene content. The hydrotreated heart cut was also contacted with the sorbents to determine amount of color removed after the hydrotreatment step.

Clay Preparation: One part clay (200-600 ml) was washed with 3 parts water, and the pH was balanced to 7 or 10. While still in the water, the clay was degassed and then collected by filtration. The collected clay was then dried in an oven. The dried clay was pre-wetted by submersion in ethylbenzene for 20 minutes with occasional agitation. The ethylbenzene/clay mixture was then filtered using a light vacuum to remove excess ethylbenzene while keeping clay completely wetted. Wetted clay was thereafter immediately packed into the reactor system described hereinbelow in order to minimize solvent evaporation.

Reactor Preparation: A batch reactor system was prepared using a 250 mL Erlenmeyer flask with a stir bar and 50 mL of pretreated and wetted clay, along with 100 mL of heart cut or hydrotreated heart cut feed. Reactor setup and heart cut treatment was performed at ambient temperature and pressure. All feeds included tert-butylcatechol (TBC) inhibitor. The feed and sorbent were mixed at 350 rpm for 2 hours at ambient temperature and pressure. These conditions are approximately equivalent to a liquid hourly space velocity (LHSV) of 1 $hr^{-1}$.

Table 4 summarizes the color number results of the treated samples. A SSFD was performed on each sample in most instances. Five distillation samples from the overhead condensate were collected for color determination, and the three overhead condensate samples with the lowest color number were averaged.

TABLE 3

Plug Flow Reactor Color Number Results

| Experiment Number* | Sample Type | Sample Description | Avg. Color Number (ASTM 1209 Color No.) | % Color Removal (normalized to % removed) |
|---|---|---|---|---|
| N/A | Mimetic pyrolysis gas, No SSFD | Inhibited, color- and sulfur-containing styrene | 66 | N/A |
| N/A | Mimetic pyrolysis gas, SSFD | Inhibited, color- and sulfur-containing styrene | 40 | 39% |
| N/A | Styrene (99%, Acros Organics), No SSFD | Reference | 10 | N/A |
| 1 | SSFD | See Table 2 | 11 | 83% |
| 2 | SSFD | See Table 2 | 14 | 79% |
| 3 | SSFD | See Table 2 | 7 | 89% |
| 4 | SSFD | See Table 2 | 3 | 95% |
| 4 | No SSFD | See Table 2 | 16 | 76% |
| N/A | SSFD | Pretreated Clay 3 (pH = 10) | 85 (Feed) 19 (Product) | 78% |
| N/A | SSFD | Pretreated Clay 2 (pH = 7) | 45 (Feed) 31 (Product) | 31% |

SSFD = Single Stage Flash Distillation performed on this sample.
No SSFD = Single Stage Flash Distillation not performed on this sample.

TABLE 4

Batch Reactor Color Number Results

| Feed | Sample Type | Sorbent | Avg. Color Number (ASTM 1209 Color No.) | % Color Removal (normalized to % removed) |
|---|---|---|---|---|
| Heart Cut | Feed No SSFD | none | 265 | N/A |
| Heart Cut | Feed SSFD | none | 255 | 4% |
| Hydrotreated Heart Cut | Feed No SSFD | none | 1616 | N/A |
| Hydrotreated Heart Cut | Feed SSFD | none | 40 | 97% |
| Heart Cut | SSFD | Pretreated Clay 2 (pH = 7) Pretreated Clay 1 (pH = 10) | 14 | 95% |
| Heart Cut | SSFD | Pretreated Clay 2 (pH = 7) Pretreated Clay 3 (pH = 10) | 6 | 98% |
| Hydrotreated Heart Cut | SSFD | Pretreated Clay 2 (pH = 7) Pretreated Clay 1 (pH = 10) | 22 | 99% |
| Hydrotreated Heart Cut | SSFD | Pretreated Clay 2 (pH = 7) Pretreated Clay 3 (pH = 10) | 30 | 98% |

SSFD = Single Stage Flash Distillation performed on this sample.
No SSFD = Single Stage Flash Distillation not performed on this sample.
*% color removal reflects total reduction in color due to SSFD and sorbent (if utilized) as compared to the color number of unaltered feed.
Clay 1 = proprietary clay #1
Clay 2 = proprietary clay #2
Clay 3 = proprietary clay #3

Example 2 verifies the effectiveness of the pretreated clays at removing compounds that contribute color found in an actual pyrolysis gasoline stream. In these cases the pH 10 combinations of clays achieved greater than 95% color removal as compared to the color of the untreated feed.

It is also interesting to note the effect of color removal on the hydrotreated pyrolysis gasoline stream where there was no contact with a sorbent. Upon hydrotreating, a simple single stage flash distillation effectively removed 97% of the color as compared to the color of the untreated feed. In contrast, with the non-hydrotreated sample, only 4% of the color was removed as a result of a simple single stage flash distillation.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A method for removing impurities from a hydrocarbon stream comprising at least one vinyl aromatic compound, said method comprising:
  contacting the hydrocarbon stream with at least one sorbent that adsorbs at least a portion of the impurities from the hydrocarbon stream to provide a purified hydrocarbon stream;
  separating the purified hydrocarbon stream from the at least one sorbent; and
  pretreating the at least one sorbent before the contacting step; wherein the pretreating step comprises making the at least one sorbent operable for adsorbing the impurities; wherein the pretreating step comprises:
  a) washing the at least one sorbent with a solvent;
  b) adjusting the pH of the at least one sorbent while in the solvent to a pH of greater than 9;
  c) degassing the at least one sorbent while in the solvent;
  d) removing the solvent from the at least one sorbent; and
  e) drying the at least one sorbent.

2. The method of claim 1, wherein the at least one vinyl aromatic compound comprises styrene.

3. The method of claim 1, wherein the impurities are selected from the group consisting of colored-impurities, sulfur-containing impurities and combinations thereof.

4. The method of claim 1, wherein the hydrocarbon stream comprises pyrolysis gasoline.

5. The method of claim 1, wherein the at least one sorbent is a clay.

6. The method of claim 5, wherein the clay is selected from the group consisting of Bentonite, Fuller's Earth and combinations thereof.

7. The method of claim 1, wherein the removing step comprises filtering the sorbent.

8. The method of claim 1, wherein two sorbents are contacted with the hydrocarbon stream.

9. The method of claim 8, wherein the two sorbents are pretreated separately and then placed in a bed prior to the contacting step.

10. The method of claim 8, wherein the two sorbents are pretreated separately and then placed in separate beds prior to the contacting step;
  wherein the separate beds are arranged in series.

11. The method of claim 1, further comprising:
  performing an additional purification process to remove the impurities from the hydrocarbon stream.

12. A method for removing impurities from a hydrocarbon stream comprising at least one vinyl aromatic compound, said method comprising:
  pretreating at least one sorbent to form at least one treated sorbent;
  wherein pretreating comprises:
    a) washing the at least one sorbent with a solvent;
    b) adjusting the pH of the at least one sorbent while in the solvent to a pH of greater than 10;
    c) degassing the at least one sorbent while in the solvent;

d) removing the solvent from the at least one sorbent; and e) drying the at least one sorbent; and contacting the hydrocarbon stream with the at least one treated sorbent to adsorb at least a portion of the impurities from the hydrocarbon stream;

wherein the impurities are selected from the group consisting of colored impurities, sulfur-containing impurities and combinations thereof.

13. The method of claim 12, wherein the at least one vinyl aromatic compound comprises styrene.

14. The method of claim 13, further comprising:
isolating the styrene from the hydrocarbon stream after the contacting step.

15. The method of claim 12, wherein two sorbents are contacted with the hydrocarbon stream.

16. The method of claim 15, wherein the two sorbents are pretreated separately and then placed in a bed prior to the contacting step.

17. The method of claim 15, wherein the two sorbents are pretreated separately and then placed in separate beds prior to the contacting step;

wherein the separate beds are arranged in series.

18. The method of claim 12, further comprising:
performing an additional purification process to remove the impurities from the hydrocarbon stream.

* * * * *